(12) United States Patent
Platzer et al.

(10) Patent No.: US 8,052,829 B2
(45) Date of Patent: Nov. 8, 2011

(54) PHOTOPOLYMERIZABLE COMPOSITIONS CONTAINING AN OXONOL DYE

(75) Inventors: Stephan J. W. Platzer, Longmeadow, MA (US); Patrick S. Vaughn, Winsted, CT (US)

(73) Assignee: Dymax Corporation, Torrington, CT (US)

( * ) Notice: Subject to any disclaimer, the term of this patent is extended or adjusted under 35 U.S.C. 154(b) by 987 days.

(21) Appl. No.: 11/925,010

(22) Filed: Oct. 26, 2007

(65) Prior Publication Data

US 2009/0110844 A1      Apr. 30, 2009

(51) Int. Cl.
*B29C 65/00* (2006.01)
*B32B 37/00* (2006.01)
*B32B 38/04* (2006.01)
*B32B 27/00* (2006.01)
*C08F 2/50* (2006.01)
*G03G 9/097* (2006.01)

(52) U.S. Cl. ............... 156/272.2; 156/278; 427/517; 522/75

(58) Field of Classification Search ............... 156/272.2, 156/278; 427/517; 522/75
See application file for complete search history.

(56) References Cited

U.S. PATENT DOCUMENTS

| | | | | |
|---|---|---|---|---|
| 3,370,950 A | 2/1968 | Verelst et al. | ............ | 430/262 |
| 3,653,905 A | 4/1972 | Depoorter et al. | ............ | 430/522 |
| 4,042,397 A | 8/1977 | Moelants et al. | ............ | 430/522 |
| 4,581,325 A | 4/1986 | Kitchin et al. | ............ | 430/522 |
| 4,935,337 A * | 6/1990 | Kuwashima et al. | ............ | 430/522 |
| 5,451,494 A | 9/1995 | Diehl et al. | ............ | 430/522 |
| 5,563,028 A | 10/1996 | Nakamura et al. | ............ | 430/522 |
| 5,633,390 A | 5/1997 | Nakamura et al. | ............ | 548/365.4 |
| 6,080,450 A | 6/2000 | Cantor | ............ | 427/517 |
| 6,136,079 A | 10/2000 | Evans et al. | ............ | 106/31.27 |
| 6,159,673 A | 12/2000 | Nishigaki et al. | ............ | 430/512 |
| 6,306,478 B1 | 10/2001 | Chen et al. | ............ | 428/64.1 |
| 6,376,163 B1 | 4/2002 | Goswam et al. | ............ | 430/559 |
| 6,444,393 B2 | 9/2002 | Nakamura et al. | ............ | 430/270.1 |
| 6,515,811 B2 | 2/2003 | Ikuhara et al. | ............ | 359/885 |
| 6,579,662 B1 | 6/2003 | Zheng et al. | ............ | 430/281.1 |
| 6,646,132 B2 | 11/2003 | Morishima et al. | ............ | 546/347 |
| 6,667,137 B2 | 12/2003 | Kottmair et al. | ............ | 430/18 |
| 6,670,475 B2 | 12/2003 | Wariishi et al. | ............ | 544/242 |
| 7,049,046 B2 | 5/2006 | Tao et al. | ............ | 430/270.1 |
| 7,112,616 B2 | 9/2006 | Takizawa et al. | ............ | 522/8 |
| 7,691,557 B2 | 4/2010 | Bachmann et al. | ............ | 430/270.1 |
| 2003/0165779 A1 | 9/2003 | Kottmair et al. | ............ | 430/302 |
| 2004/0204513 A1* | 10/2004 | Takizawa et al. | ............ | 522/2 |
| 2005/0003135 A1 | 1/2005 | Schmidhalter et al. | ............ | 428/64.8 |
| 2007/0004836 A1 | 1/2007 | Bachmann et al. | ............ | 524/325 |

FOREIGN PATENT DOCUMENTS

| | | |
|---|---|---|
| EP | 0 339 841 | 11/1989 |
| EP | 0 833 314 | 4/1998 |
| WO | WO 03/042989 | 5/2003 |

OTHER PUBLICATIONS

"A new class of light-fast oxonol dyes: organic-glass forming salts of oxonol anions and 4,4'-bipyridinium cations", Y. Inagaki et al., J. Mater.Chem., 2006, 16, 345-347.

"Photophysical properties of an extended bis-oxonol dye", A. Benniston et al, J. Photochem. and Photobio. A: Chemistry, 2004, 163, 61-67.

"Synethesis and characterization of new long-wavelength-absorbing oxonol dyes from the 2,2-difluoro-1,3,2-dioxaborine type", M. Halik et al., Chem. Eur. J., 1999, 5(9), 2511-2517.

"Oxonol dyes: X-ray crystallographic and solid state 13C nuclear magenetic resonance studies of some organic semiconductors", M. Grossel et al., J. Mater. Chem., 1991, 1(2), 223-231.

* cited by examiner

*Primary Examiner* — James Sells
*Assistant Examiner* — Michael Orlando
(74) *Attorney, Agent, or Firm* — Roberts & Roberts, LLP

(57) ABSTRACT

The invention relates to photopolymerizable compositions containing an oxonol dye, which compositions cure by exposure to ultraviolet and/or visible radiation and whose visible color is substantially reduced during exposure. More particularly, the invention pertains to photopolymerizable compositions comprising a pyridin-2,6-dione oxonol dye in an admixture of a polymerizable component and a photopolymerization initiator. Such compositions find use as adhesives, coatings, and the like. The disappearance of the visible color of the oxonol dye acts as an indicator of full cure of a photopolymerizable composition.

26 Claims, No Drawings

PHOTOPOLYMERIZABLE COMPOSITIONS CONTAINING AN OXONOL DYE

BACKGROUND OF THE INVENTION

1. Field of the Invention

The invention relates to photopolymerizable compositions containing an oxonol dye. More particularly, the invention pertains to photopolymerizable compositions comprising an oxonol dye in an admixture of a polymerizable component and a photopolymerization initiator. Such compositions find use as adhesives, coatings, and the like. The compositions cure by exposure to ultraviolet and/or visible radiation, and photobleach to reduce the visible color compared to the pre-cured composition. The photobleaching or disappearance of the visible color of the oxonol dye acts as an indicator of a substantially full cure of the photopolymerizable composition.

2. Description of the Related Art

It is known in the art to produce light sensitive adhesive and coating compositions which adhere to critical surfaces. For example, in the field of medical devices, it is important to inspect catheter interfaces to assure that adjacent surfaces are actually bonded. It is known in the art to incorporate compounds into coating compositions to provide a method for inspection. The prior art describes the incorporation of agents into UV-curable coatings as a means for identifying the presence of a cured film and for insuring that they are properly covered with the coatings. For example, U.S. Pat. No. 6,080,450 describes a visible emitting fluorescing agent to provide a method for the inspection of a UV-cured deposit. Oxonol dyes are well known in the art. U.S. Pat. No. 7,112,616 describes oxonol dyes plus methine, cyanine, and merocyanine dyes for a two-photon absorbing polymerizable composition which is exposed in the non-linear absorption band of the dye. It does not mentioned oxonol dyes having a pyridin-2,6-dione ring nor an 5-oxo-2-isoxazoline ring. The preferred oxonol dyes from this patent have a barbituric acid ring, which has been found to be too fast, such that color changes before cure rather than at or shortly after cure.

The radiation curable composition is composed of a free radical polymerizable component, a free radical photopolymerization initiator, and an oxonol dye. It has now been found that prior to light exposure, the radiation curable composition has a visible color. After exposure, the color is substantially reduced or disappears, and indicates that the composition has been cured. Dye color as measured after exposure for full cure of the radiation curable composition is less than 20% of the original color as measured before exposure. The disappearance of the color occurs at an exposure after full cure and before double that for full cure. The dye color is stable in the photopolymerizable admixture and under non-actinic radiation. For example, if the photopolymerizable admixture is sensitive to UV light and not to visible light, then the dye color changes under UV light and is stable under visible light.

Thus, when the composition is applied to a surface as a coating or between two surfaces as an adhesive, the color remains visible. After being exposed to UV radiation the resonance structure of the dye is destroyed and the dye can no longer resonate thereby decreasing its visible color attribute. The color of the adhesive or coating is substantially reduced and indicates a substantially full cure of the radiation curable composition

SUMMARY OF THE INVENTION

The invention provides a radiation curable composition comprising a substantially homogeneous admixture of an organic, free radical polymerizable component, a free radical photopolymerization initiator, and a pyridin-2,6-dione oxonol dye.

The invention also provides a method of preparing a radiation curable composition comprising forming a substantially homogeneous admixture of an organic, free radical polymerizable component, a free radical photopolymerization initiator, and an oxonol dye; wherein the free radical photopolymerization initiator is present in an amount sufficient to initiate the polymerization of said free radical polymerizable component upon exposure to sufficient actinic radiation.

The invention further provides a method for adhering a first surface to a second surface which comprises:

a) applying to a first surface a radiation curable composition comprising a substantially homogeneous admixture of an organic, free radical polymerizable component, a free radical photopolymerization initiator, and an oxonol dye, wherein the free radical photopolymerization initiator is present in an amount sufficient to initiate the polymerization of said free radical polymerizable component upon exposure to sufficient actinic radiation;

b) contacting a second surface to the radiation curable composition; and c) exposing the radiation curable composition to sufficient actinic radiation to initiate the polymerization of said polymerizable component while maintaining contact of the radiation curable composition with the first surface and the second surface.

The invention still further provides a method for curing a radiation curable composition which comprises:

a) applying to a first surface a radiation curable composition comprising a substantially homogeneous admixture of an organic, free radical polymerizable component, a free radical photopolymerization initiator, and an oxonol dye, wherein the free radical photopolymerization initiator is present in an amount sufficient to initiate the polymerization of said free radical polymerizable component upon exposure to sufficient actinic radiation; and b) exposing the radiation curable composition to sufficient actinic radiation to initiate the free radical polymerization of said free radical polymerizable component.

The invention also provides a method for adhering a coating to a surface which comprises a) applying to a surface a radiation curable composition comprising a substantially homogeneous admixture of an organic, free radical polymerizable component, a free radical photopolymerization initiator, and an oxonol dye, wherein the free radical photopolymerization initiator is present in an amount sufficient to initiate the polymerization of said free radical polymerizable component upon exposure to sufficient actinic radiation; and b) exposing the radiation curable coating composition to sufficient actinic radiation to initiate the free radical polymerization of said free radical polymerizable component.

DESCRIPTION OF THE INVENTION

The invention provides a radiation curable composition comprising a substantially homogeneous admixture of an organic, free radical polymerizable component, a free radical photopolymerization initiator, and an oxonol dye.

Prior to light exposure, the radiation curable composition has a visible color. After exposure, the color substantially disappears and indicates that the composition has been fully cured. Dye color as measured after exposure for full cure of the radiation curable composition is less than 20% of the original color as measured before exposure, preferably less than 10%, more preferably less than 5%. The disappearance of the color should occur at an exposure after full cure and before double that for full cure. The color can be measured as the absorbance of the dye in the visible region (400-700 nm) at the dye's maximum absorbance peak. Full cure can be determined by measuring the hardness of the material with a durometer. Preferably the hardness at full cure is at least 90% of the maximum hardness of the photopolymerizable admixture. Full cure can also be determined by measuring the amount of unreacted acrylate groups. This can be done by measuring the unsaturated FTIR peak at 810 cm$^{-1}$. The dye color should be stable in the photopolymerizable mixture. It should also be stable under non-actinic radiation. For example, if the photopolymerizable mixture is sensitive to UV light and not to visible light, then the dye color should change under UV light and be stable under visible light.

It is preferred that the radiation curable composition does not contain any photopolymerization initiators with onium groups, such as iodonium, sulfonium, and diazonium as are preferred in U.S. Pat. No. 7,112,616. In addition, it is preferred that the radiation curable composition does not contain bisimidazole or trihalomethyl triazine photopolymerizable initiators, which compounds can cause the dye to fade upon storage under white light without the composition curing.

In general, oxonol dyes have a carbonyl group and a carbinol group. The two groups may be part of a ring or of separate rings on a molecule. The preferred oxonol dyes can be represented as $Z_1$=(CH—CH=$)_n$CH—$Z_2$. $Z_1$ contains the carbonyl group, and $Z_2$ contains the carbinol group, in which n represents an integer 0, 1, 2, or 3. $Z_1$ and $Z_2$ each can represent an atomic group that forms a 5 or 6 membered ring. The rings are preferably heterocyclic. One or both of the rings may be condensed with another ring. Examples of rings for $Z_1$ include 2-pyrazolon-5-one; pyrazolidine-3,5-dione; imidazolin-5-one; isoxazolin-5-one; hydantoin; thiohydantoin; 2-oxazolin-5-one; rhodanine; indolin-3-one; 1,3-dioxane-4,6-dione; indane-1,3-dione; thiophen-3-one; 1,3-dioxane-4,6-dione; barbituric acid; and 2-thiobarbituric acid. The preferred ring for $Z_1$ is pyridin-2,6-dione. Examples of rings for $Z_2$ are similar to those for $Z_1$ with the change of at least one of the carbonyl groups to a carbinol group. For example, pryridin-2,6-dione becomes 2-hydroxypryridin-6-one.

The hydroxyl group in the carbinol group may be replaced by an oxide salt. Examples of the counterion, namely, the cation include sodium; potassium; triethylazanium; tetramethylammonium; tri-(2-hydroxyethyl)azanium; [4-methylphenyl-(2-methylpropyl)phenyl]iodonium; 1,1'-diphenyl-4,4'-bipryidinium; 1,1'-diheptyl-4,4'-bipryidinium; 1,1'-diethyl-4,4'-bipryidinium; 1,1'-dibenzyl-4,4'-bipryidinium; 2-bromo-1-ethyl-pyrdinium; poly(4-vinyl-pyridinium) and 4-methylmorpholinium. The counterion is preferably selected to make the oxonol dye readily soluble in the photopolymerizable admixture. If the counterion has a hydroxy group, it can be reacted with an isocyanate group of a monomer, oligomer or polymer.

Useful pryridin-2,6-dione oxonol dyes non-exclusively include, alone or in combination:
(a) 5-cyano-3-[3-(5-cyano-1-ethyl-4-methyl-2,6-dioxopyridin-3-ylidene)prop-1-enyl]-1-ethyl-4-methyl-6-oxopyridin-2-olate; triethylazanium;
(b) 5-cyano-3-[3-(5-cyano-1-methyl-4-methyl-2,6-dioxopyridin-3-ylidene)prop-1-enyl]-1-methyl-4-methyl-6-oxopyridin-2-olate; triethylazanium;
(c) 5-cyano-3-[3-(5-cyano-1-propyl-4-methyl-2,6-dioxopyridin-3-ylidene)prop-1-enyl]-1-propyl-4-methyl-6-oxopyridin-2-olate; triethylazanium;
(d) 5-cyano-3-[3-(5-cyano-1-n-butyl-4-methyl-2,6-dioxopyridin-3-ylidene)prop-1-enyl]-1-n-butyl-4-methyl-6-oxopyridin-2-olate; triethylazanium;
(e) 5-cyano-3-[3-(5-cyano-1-t-butyl-4-methyl-2,6-dioxopyridin-3-ylidene)prop-1-enyl]-1-t-butyl-4-methyl-6-oxopyridin-2-olate; triethylazanium;
(f) 5-cyano-3-[3-(5-cyano-1-phenyl-4-methyl-2,6-dioxopyridin-3-ylidene)prop-1-enyl]-1-phenyl-4-methyl-6-oxopyridin-2-olate; triethylazanium;
(g) 5-cyano-3-[(3-(5-cyano-1-ethyl-4-methyl-2,6-dioxopyridin-3-ylidene)penta-1,3-dienyl]-1-ethyl-4-methyl-6-oxopyridin-2-olate; triethylazanium;
(h) 5-cyano-3-[3-(5-cyano-1-ethyl-4-methyl-2,6-dioxopyridin-3-ylidene)methenyl]-1-ethyl-4-methyl-6-oxopyridin-2-olate; triethylazanium;
(i) 5-cyano-3-[3-(5-cyano-1-ethyl-4-methyl-2,6-dioxopyridin-3-ylidene)prop-1-enyl]-1-ethyl-4-methyl-6-oxopyridin-2-olate; sodium;
(j) 5-cyano-3-[3-(5-cyano-1-methyl-4-methyl-2,6-dioxopyridin-3-ylidene)prop-1-enyl]-1-methyl-4-methyl-6-oxopyridin-2-olate; sodium;
(k) 5-cyano-3-[3-(5-cyano-1-ethyl-4-methyl-2,6-dioxopyridin-3-ylidene)prop-1-enyl]-1-ethyl-4-methyl-6-oxopyridin-2-olate; tetramethylammonium;
(l) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-diphenyl-4,4'-bipryidinium;
(m) 5-cyano-3-[3-(5-cyano-1-ethyl-4-methyl-2,6-dioxopyridin-3-ylidene)prop-1-enyl]-1-ethyl-4-methyl-6-oxopyridin-2-olate; [4-methylphenyl-(2-methylpropyl)phenyl]iodonium;
(n) 5-cyano-3-[3-(5-cyano-1-ethyl-4-methyl-2,6-dioxopyridin-3-ylidene)prop-1-enyl]-1-ethyl-4-methyl-6-oxopyridin-2-olate; tri-(2-hydroxyethyl)azanium;
(o) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-diheptyl-4,4'-bipyridinium;
(p) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 4-methylmorpholinium;
(q) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 2-bromo-1-ethyl-pyridinium
(r) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-diethyl-4,4'-bipyridinium;
(s) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-dibenzyl-4,4'-bipyridinium; or
(t) 1-butyl-5-(3-(1-butyl-5-cyano-1,6-dihydro-2-hydroxy-4-methyl-6-oxo-3-pyridyl)allylidene)-1,2,5,6-tetrahydro-4-methyl-2,6-dioxonicotinonitrile (CAS 30132-47-9).

Useful 5-oxo-2-isoxazoline oxonol dyes non-exclusively include, alone or in combination:
(u) 4-[5-(5-oxo-3-phenyl-2H-1,2-oxazol-4-yl)penta-2,4-dienylidene]-3-phenyl-1,2-oxazol-5-one (CAS 61389-30-8; 610 nm max)
(v) 4-[5-(5-oxo-3-propyl-2H-1,2-oxazol-4-yl)penta-2,4-dienylidene]-3-propyl-1,2-oxazol-5-one (CAS 64724-75-0)

Useful 2-pyrazolin-5-one oxonol dyes non-exclusively include, alone or in combination:
(w) 2,4-dihydro-4-[3-(5-hydroxy-3-methyl-1-1H-pyrazol-4-yl)-2-propenylidene]-5-methyl-2-phenyl-3H-pyrazol-3-one (CAS 27981-68-6)
(z) 4-[4-[5-hydroxy-3-methyl-1-(4-sulfophenyl)-1H-pyrazol-4-yl]methylene]-3-methyl-5-oxo-1H-pyrazol-1-yl]-benzenesulfonic acid
(y) 4-[(3-ethoxycarboxy-5-hydroxy-1-phenyl-1H-pyrazol-4-yl)methylene]-4,5-dihydro-5-oxo-1-phenyl-1H-pyrazole-3-carboxylic acid, ethyl ester (CAS 116735-94-5)

(z) 4-[3-(3-ethoxycarboxy-5-hydroxy-1-phenyl-1H-pyrazol-4-yl)-2-propenylidene]-4,5-dihydro-5-oxo-1-phenyl-1H-pyrazole-3-carboxylic acid, ethyl ester (zz) 4-[3-(3-carboxy-5-hydroxy-1-phenyl-1H-pyrazol-4-yl)-2-propenylidene]-4,5-dihydro-5-oxo-1-phenyl-1H-pyrazole-3-carboxylic acid (CAS 29212-95-1)

Useful barbituric acid oxonol dyes non-exclusively include, alone or in combination:

(A) 1,3-dibutyl-5-[5-(1,3-dibutyl-4-hydroxy-2,6-dioxopyrimidin-5-yl)penta-2,4-dienylidene]-1,3-diazinane-2,4,6-trione (CAS 63560-89-4; 615 nm max)

(B) 1,3-dimethyl-5-[5-(1,3-dimethyl-4-hydroxy-2,6-dioxopyrimidin-5-yl)penta-2,4-dienylidene]-1,3-diazinane-2,4,6-trione (CAS 78902-42-8)

The oxonol dye is usually present in the radiation curable composition in an amount of from about 0.0002 wt. % to about 2 wt. %, more usually from about 0.001 wt. % to about 0.5 wt. %, and still more usually from about 0.002 wt. % to about 0.2 wt. % based on the weight of the radiation curable composition.

The organic, free radical polymerizable component may be a monomer, oligomer, or polymer having at least one and preferably two olefinically unsaturated double bonds. Such are well known in the art. Useful free radical polymerizable components include acrylates and methacrylates. Suitable for use as polymerizable components are urethane acrylate or urethane methacrylate oligomers based upon polyethers or polyesters, which are reacted with aromatic, aliphatic, or cycloaliphatic diisocyanates and capped with hydroxy acrylates. Examples of oligomers nonexclusively include difunctional urethane acrylate oligomers such as a polyester of hexanedioic acid and diethylene glycol, terminated with isophorone diisocyanate, capped with 2-hydroxyethyl acrylate (CAS 72121-94-9); a polypropylene glycol terminated with tolyene-2,6-diisocyanate, capped with 2-hydroxyethylacrylate (CAS 37302-70-8); a polyester of hexanedioic acid and diethylene glycol, terminated with 4,4'-methylenebis(cyclohexyl isocyanate), capped with 2-hydroxyethyl acrylate (CAS 69011-33-2); a polyester of hexanedioic acid, 1,2-ethanediol, and 1,2 propanediol, terminated with tolylene-2,4-diisocyanate, capped with 2-hydroxyethyl acrylate (CAS 69011-31-0); a polyester of hexanedioic acid, 1,2-ethanediol, and 1,2 propanediol, terminated with 4,4'-methylenebis(cyclohexyl isocyanate, capped with 2-hydroxyethyl acrylate (CAS 69011-32-1); a polyester of hexanedioic acid, diethylene glycol, terminated with isophorone diisocyanate, capped with 2-hydroxyethyl acrylate (CAS 72121-94-9); a polytetramethylene glycol ether terminated with 4,4'-methylenebis (cyclohexylisocyanate), capped with 2-hydroxyethyl acrylate; and a hydroxy terminated polybutadiene terminated with isophorone diisocyanate, capped with 2-hydroxyethyl acrylate; Also useful are monofunctional urethane acrylate oligomers, such as a polypropylene terminated with 4,4'-methylenebis(cyclohexylisocyanate), capped with 2-hydroxyethyl acrylate and 1-dodosanol. They also include difunctional urethane methacrylate oligomers such as a polytetramethylene glycol ether terminated with tolylene-2,4-diisocyanate, capped with 2-hydroxyethyl methacrylate; a polytetramethylene glycol ether terminated with isophorone diisocyanate, capped with 2-hydroxyethyl methacrylate); a polytetramethylene glycol ether terminated with 4,4'-methylenebis(cyclohexylisocyanate), capped with 2-hydroxyethyl methacrylate; and a polypropylene glycol terminated with tolylene-2,4-diisocyanate, capped with 2-hydroxyethyl methacrylate. Preferably the organic, free radical polymerizable component is a monomer. Especially useful are the monofunctional acrylates or methacrylates, such as N,N-dimethylacrylamide (CAS 2680-03-7); isobornyl acrylate (CAS 5888-33-5); isobornyl methacrylate (CAS 7534-94-3); 2-hydroxyethyl acrylate (CAS 818-61-1); 2-hydroxyethyl methacrylate (CAS 868-77-9); 4-hydroxybutyl acrylate (CAS 2478-10-6); hydroxybutyl methacrylate (CAS 29008-35-3); hydroxypropyl acrylate (CAS 25584-83-2); hydroxypropyl methacrylate (CAS 27813-02-1); tetrahydrofurfuryl acrylate (CAS 2399-48-6); tetrahydrofurfuryl methacrylate (CAS 2455-24-5); dodecyl acrylate (CAS 2156-97-0); phenyl glycidyl ether acrylate; 2-(2-ethoxyethoxy)ethyl acrylate (CAS 7328-17-8); 2-ethylhexyl acrylate (CAS 103-11-7); 2-ethoxyethyl acrylate (CAS 106-74-1); 2-butoxyethyl acrylate (CAS 7251-90-3); 2-naphthyl acrylate (CAS 52684-34-1); butyl acrylate (CAS 141-32-2); lauryl acrylate (CAS 2156-97-0); trimethylsilyl acrylate (CAS 13688-55-6); 2-hydroxy-3-phenoxypropyl acrylate (CAS 16969-10-1); 2,2,3,3,3,-pentafluoropropyl acrylate (CAS 356-86-5); glycidyl acrylate (CAS 106-91-2); glycidyl methacrylate (CAS 106-90-1); and 1-vinyl-2-pyrrolidone (CAS 88-12-0). Difunctional acrylates and methacrylates are also useful, such as ethylene glycol diacrylate (CAS 2274-11-5); di(ethylene glycol) diacrylate (CAS 4074-88-8); tetra(ethylene glycol) diacrylate (CAS 17831-71-9; poly(ethylene glycol) diacrylate (CAS 26570-48-9); ethylene glycol dimethacrylate (CAS 97-90-5); di(ethylene glycol) dimethacrylate (CAS 2358-84-1); and poly(ethylene glycol) dimethacrylate (CAS 25852-47-5). Trifunctional acylates and methacrylates are also useful, such as pentaerythritol triacrylate (CAS 3524-68-3); trimethylolpropane triacrylate (CAS 15625-89-5); pentaerthritol propoxylate triacrylate (CAS 145611-81-0); trimethylol propane ethoxylate triacrylate (CAS 28961-43-5); trimethylolpropane propoxylate triacrylate (CAS 53879-54-2); trimethylolpropane trimethacrylate (CAS 3290-92-4). Tetrafunctional acrylates and methacrylates are also useful, such as di(trimethylolpropane) tetraacrylate (CAS 94108-97-1); and pentaerythritol tetraacrylate (CAS 4986-89-4). In addition, pentafunctional and hexafunctional acrylates, such as dipentaerythritol pent-/hexa-acrylates (CAS 60506-81-2) can be used. The organic, free radical polymerizable component is present in an amount sufficient to polymerize upon exposure to sufficient actinic radiation. In the preferred embodiment, the organic, free radical polymerizable component is present in the overall radiation curable composition in an amount of from about 1 wt. % to about 99 wt. %, preferably from about 30 wt. % to about 99 wt. % based on the non-solvent parts of the overall radiation curable composition.

The inventive radiation curable composition further comprises a free radical polymerization initiator component which preferably photolytically generates free radicals. Examples of free radical generating components include photoinitiators which themselves photolytically generate free radicals by a fragmentation. Suitable initiators include aromatic ketones. Preferred examples thereof include benzophenone, benzoin, acetoin, acyloin, diketone, xanthone, thioxanthone, and ketocoumarin derivatives. Specific examples include benzophenone (CAS 119-61-9); Michler's ketone (CAS 90-94-1); benzoin methyl ether (CAS 3524-62-7); benzoin ethyl ether (CAS 574-09-4); 2-hydroxy-2-methylpropiophenone (CAS 7473-98-5); 1-hydroxycyclohexyl phenyl ketone (CAS 947-19-3); 2,2-diethoxyacetophenone (CAS 6175-45-7); camphorquinone (CAS 10373-78-1); 2-ethylanthraquinone (CAS 84-51-5); 2-tert-butylanthraquinone (CAS 84-47-9; 2,3-dichloro-1,4-naphthoquinone (CAS 117-80-6) 2-hydroxy-4'-(2-hydroxyethoxy)-2-methylpropiophenone (CAS 106797-53-9); methyl benzoylformate (CAS 15206-55-0); 2,2-dimethoxy-2-phenylacetophenone (CAS 24650-42-8); 2-ethylhexy-4-(dimethylamino)benzoate (CAS 21245-02-3); 2-ethyl-4-(dimethylamino)benzoate (CAS 10287-53-3); 2-isopropylthioxanthone (CAS 5495-84-1); 4-phenylbenzophenone (CAS 2128-93-0); and 2-benzyl-2-(dimethylamino)-4'-morpholinobutyrophenone (CAS 119313-12-1). In addition, suitable photoinitiators include phosphine oxides, such as diphenyl(2,4,6-trimethylbenzoyl)

phosphine oxide (CAS 75980-60-8); and phenylbis(2,4,6-trimethylbenzoyl)phosphine oxide (CAS 162881-26-7).

The free radical generating component is preferably present in an amount sufficient to effect polymerization of the polymerizable compound upon exposure to sufficient actinic radiation, especially in the visible and/or ultraviolet region of the electromagnetic spectrum. The polymerization initiator may comprise from about 0.1 wt. % to about 50 wt. % of the non-solvent parts of the radiation curable composition, more preferably from about 0.1 wt. % to about 10 wt. %. The addition of cationic onium photoinitiators, such as diphenyliodonium hexafluorophosphate (CAS 58109-40-3), should not be used since they can cause the color to disappear before full cure is achieved.

Various optional additives may be added to the composition depending on the specific end-use of the radiation curable composition and other various conditions. Examples of these include thermal polymerization inhibitors, plasticizers, fillers, electrically conductive particles, thermally conductive particles, spacers, colorants, adhesion promoters, surfactants, sensitizers, fluorescing agents, and others. Examples of suitable thermal polymerization inhibitors include hydroquinone, hydroquinone monomethyl ether, catechol, beta-naphthol, mono-t-butylhydroquinone, pyrogallol, 4-tert-butylphenol, 2,5-di-tert-butylhydroquinone or 2,6-di-tertbutyl-4-methylphenol. A suitable amount of the thermopolymerization inhibitor which can be used ranges from about 0.01 wt. % to about 5 wt. %, preferably 0.1 wt. % to 3 wt. %, based on the weight of the non-solvent parts of the composition. Examples of suitable plasticizers include dioctyl phthalate, dibutyl phthalate, butyl phthalyl, butyl glycolate, tricresyl, phosphate, polyester series plasticizers and chlorinated paraffins. A suitable amount of the plasticizer can range from about 0.1 wt. % to about 20 wt. %, preferably 1 wt. % to 10 wt. %, by weight based on the weight of the non-solvent parts of the radiation curable composition.

The radiation curable composition of the invention finds use as an adhesive or a coating composition. Although the radiation curable composition may comprise a compatible solvent, preferably the composition is substantially free of solvents, such as organic, nonreactive solvents. In a preferred embodiment of the radiation curable composition has a polymerizable component which is a urethane acrylate and/or methacrylate oligomer in combination with an acrylate monomer and/or an methacrylate monomer; wherein the polymerization initiator comprises a ketone and/or a phosphine oxide.

The radiation curable composition may be prepared by admixing the composition components until a substantially homogenous fluid is formed. In one use, the radiation curable composition is formed and then exposed to sufficient actinic radiation to initiate the polymerization of said polymerizable component. In another embodiment, the radiation curable composition is applied as a coating onto a surface and then exposed to sufficient actinic radiation to initiate the polymerization of said polymerizable component. In another embodiment, the radiation curable composition in the form of an adhesive is applied to a first surface and then contacting a second surface to the radiation curable composition, and then exposing the radiation curable adhesive composition to sufficient actinic radiation to initiate the polymerization of said polymerizable component while maintaining contact of the radiation curable adhesive composition with the first surface and the second surface. The polymerization of the polymerizable component may be initiated by exposure to visible and/or ultraviolet. In one embodiment, the polymerization of said polymerizable component may be initiated by exposure to radiation having a wavelength of from about 300 nm to about 465 nm, preferably about 360 nm to about 410 nm. In another embodiment, the polymerization of the polymerizable component may be initiated by exposure to ultraviolet radiation, visible radiation, or combinations thereof, by means of a light emitting diode such as those having an emission wavelength of from about 360 nm to about 465 nm, preferably about 380 nm to about 410 nm.

The length of time for exposure is easily determined by those skilled in the art and depends on the selection of the particular components of the radiation curable composition. Typically exposure ranges from about 1 second to about 60 seconds, preferably from about 2 seconds to about 30 seconds, and more preferably from about 2 seconds to about 15 seconds. Typical exposure intensities range from about 5 mW/cm$^2$ to about 600 W/cm$^2$, preferably from about 10 mW/cm$^2$ to about 450 W/cm$^2$, and more preferably from about 50 mW/cm$^2$ to about 300 W/cm$^2$.

The following non-limiting examples serve to illustrate the invention.

EXAMPLES 1-11

The following solutions were prepared and coated to a thickness of 2 mm. The samples were cured for various times under the same UV exposure intensity with a mercury doped bulb (200 mW/cm$^2$ at 365 nm). The exposure time for full cure (FC) was determined by measuring the hardness of the coating. The time for color disappearance (CD) was determined by measuring the maximum absorbance of the dye with a UV-Vis spectrophotometer. UR3 is a difunctional urethane acrylate oligomer (CAS 72121-94-9; polyester of hexanedioic acid and diethylene glycol, terminated with isophorone diisocyanate, capped with 2-hydroxyethyl acrylate); UR5 is a difunctional urethane acrylate oligomer (CAS 69011-33-2; polyester of hexanedioic acid and diethylene glycol, terminated with 4,4'-methylenebis(cyclohexyl isocyanate, capped with 2-hydroxyethyl acrylate); UR7 is a difunctional urethane methacrylate oligomer (polytetramethylene glycol ether terminated with tolylene-2,4-diisocyanate, capped with 2-hydroxyethyl methacrylate); UR8 is a difunctional urethane methacrylate oligomer (polytetramethylene glycol ether terminated with isophorone diisocyanate, capped with 2-hydroxyethyl methacrylate); UR9 is a difunctional urethane methacrylate oligomer (polytetramethylene glycol ether terminated with 4,4'-methylenebis(cyclohexylisocyanate), capped with 2-hydroxyethyl methacrylate); UR10 is a difunctional urethane acrylate (hydroxy terminated polybutadiene terminated with isophorone diisocyanate, capped with 2-hydroxyethyl acrylate); UR11 is a monofunctional urethane acrylate oligomer (polypropylene terminated with 4,4'-methylenebis(cyclohexylisocyanate), capped with 2-hydroxyethyl acrylate and 1-dodosanol); UR12 is a difunctional urethane methacrylate oligomer (CAS 69011-31-0; polyester of hexanedioic acid, 1,2-ethanediol, and 1,2 propanediol, terminated with tolylene-2,4-diisocyanate, capped with 2-hydroxyethyl acrylate); DMA is N,N-dimethylacrylamide (CAS 2680-03-7); IBOA is isobornyl acrylate (CAS 5888-33-5); HEMA is 2-hydroxyethyl methacrylate (CAS 868-77-9); DDA is dodecyl acrylate (CAS 2156-97-0); PGEA is phenyl glycidyl ether acrylate; DPO is diphenyl(2,4,6-trimethylbenzoyl)phosphine oxide (CAS 75980-60-8); PPO is phenylbis(2,4,6-trimethylbenzoyl)phosphine oxide (CAS 162881-26-7); HMP is 2-hydroxy-5-methylpropiophenone (CAS 7473-98-5); HPK is 1-hydroxycyclohexyl phenyl ketone (CAS 947-19-3); MBF is methyl benzoylformate (CAS 15206-55-0); DP is 2,2-dimethoxy-2-phenylacetophenone (CAS 24650-42-8); TPM is 3-(trimethoxysilyl)propyl methacrylate (CAS 2530-85-0); EGMP is ethylene glycol methacrylate phosphate (CAS 24599-21-1); RBB is Rodamine B base (CAS 509-34-2); AA is acrylic acid (CAS 79-10-7); FS is fumed silica (CAS 112945-52-5); PEG is poly(ethylene glycol) (CAS 25322-68-3); TBP is tert-butyl peroxybenzoate (CAS 614-45-9); and HA is hydrated aluminum.

| | 1 | 2 | 3 | 4 | 5 | 6 | 7 | 8 | 9 | 10 | 11 |
|---|---|---|---|---|---|---|---|---|---|---|---|
| UR3 | 37 | | | | | | | | | | |
| UR5 | | | | | | | | 41 | | | |
| UR7 | | | | | 47 | | | | | | |
| UR8 | | 35 | | 45 | | | | | | | |
| UR9 | | | 40 | | | | | | 30 | 20 | |
| UR10 | | | | | | 45 | | | | | |
| UR11 | | | | | | | 50 | | | | |
| UR12 | | | | | | | | | | | 69 |
| DMA | 30 | 25 | 27 | 20 | 25 | | | 25 | | 10 | 25 |
| IBOA | 30 | 35 | 30 | 30 | 25 | 30 | 4 | 25 | 27 | | |
| HEMA | | | | | | 20 | 10 | | 10 | | |
| DDA | | | | | | | 30 | | | | |
| PGEA | | | | | | | | | 15 | | |
| DPO | 1 | 1 | | 1 | | | | | 1 | | |
| PPO | | | | | | 1 | | | | 2 | 1 |
| HMP | 1 | 1 | | 1 | | | | | | 1 | |
| HPK | | 3 | 3 | 3 | | 3 | 4 | | 1 | | 2 |
| MBF | | | | | 3 | | | | | | |
| DP | | | | | | | | 2 | 1 | | |
| TPM | 1 | | | | | | | 2 | 1 | | |
| EGMP | | | | | | 1 | 2 | | 1 | | |
| RBB | | | | | 0.02 | | | | | | |
| AA | | | | | | | 2 | | 4 | 3 | |
| FS | | | | | | | | 5 | | 1 | 3 |
| PEG | | | | | | | | | 9 | | |
| TBP | | | | | | | | | 1 | | |
| HA | | | | | | | | | | 62 | |
| Dye a4 | 0.002 | 0.002 | 0.002 | 0.002 | 0.002 | 0.002 | 0.002 | 0.002 | 0.002 | 0.002 | 0.002 |
| FC (sec) | 18 | 25 | 22 | 20 | 25 | 10 | 20 | 22 | 22 | 20 | 30 |
| CD (sec) | 25 | 35 | 25 | 30 | 30 | 12 | 25 | 30 | 30 | 35 | 40 |

EXAMPLES 12-22

The following solutions were prepared and coated to a thickness of 2 mm. The samples were cured for various times under the same UV exposure intensity as that for examples 1-11. The exposure time for full cure (FC) and that for color disappearance (CD) were recorded as above. Note that the color disappeared before full cure was achieved with comparative examples 20, 21, and 22 with dyes u, y, and A, respectively. UR13 is a difunctional urethane acrylate oligomer (polytetramethylene glycol ether terminated with 4,4'-methylenebis(cyclohexylisocyanate), capped with 2-hydroxyethyl acrylate); and TMA is trimethylolpropane triacrylate (CAS 15625-89-5).

| | 12 | 13 | 14 | 15 | 16 | 17 | 18 | 19 | 20 | 21 | 22 |
|---|---|---|---|---|---|---|---|---|---|---|---|
| UR13 | 45 | 45 | 45 | 45 | 45 | 45 | 45 | 45 | 45 | 45 | 45 |
| DMA | 25 | 25 | 25 | 25 | 25 | 25 | 25 | 25 | 25 | 25 | 25 |
| IBOA | 20 | 20 | 20 | 20 | 20 | 20 | 20 | 20 | 20 | 20 | 20 |
| TMA | 5 | 5 | 5 | 5 | 5 | 5 | 5 | 5 | 5 | 5 | 5 |
| HMP | 2 | 2 | 2 | 2 | 2 | 2 | 2 | 2 | 2 | 2 | 2 |
| HPK | 1 | 1 | 1 | 1 | 1 | 1 | 1 | 1 | 1 | 1 | 1 |
| AA | 2 | 2 | 2 | 2 | 2 | 2 | 2 | 2 | 2 | 2 | 2 |
| Dye a | 0.002 | | | | | | | | | | |
| Dye b | | 0.002 | | | | | | | | | |
| Dye d | | | 0.002 | | | | | | | | |
| Dye l | | | | 0.002 | | | | | | | |
| Dye m | | | | | 0.002 | | | | | | |
| Dye o | | | | | | 0.002 | | | | | |
| Dye q | | | | | | | 0.002 | | | | |
| Dye r | | | | | | | | 0.002 | | | |
| Dye u | | | | | | | | | 0.002 | | |
| Dye y | | | | | | | | | | 0.002 | |
| Dye A | | | | | | | | | | | 0.002 |
| FC (sec) | 20 | 20 | 20 | 20 | 20 | 20 | 20 | 20 | 20 | 20 | 20 |
| CD (sec) | 25 | 30 | 22 | 25 | 20 | 25 | 25 | 25 | 18 | 18 | 12 |

EXAMPLES 23-24

The following solutions were prepared and placed as a thin layer between two glass slides. The samples were cured for various times under the same UV exposure intensity as that for examples 1-22. The exposure time for full cure (FC) was determined by measuring the time at which the glass slides were glued together, fixed. The color disappearance (CD) was recorded as above. IBOMA is isobornyl methacrylate (CAS 7534-94-3).

|         | 23    | 24    |
|---------|-------|-------|
| UR5     | 30    |       |
| UR7     |       | 47    |
| DMA     | 25    |       |
| IBOA    | 40    | 15    |
| IBOMA   |       | 15    |
| HEMA    | 15    |       |
| DP      | 3     | 1     |
| HPK     | 2     |       |
| TPM     | 2     |       |
| AA      | 1     |       |
| FS      | 2     | 2     |
| Dye a   | 0.002 | 0.002 |
| FC (sec)| 5     | 5     |
| CD (sec)| 8     | 6     |

EXAMPLES 25-26

The following solutions were prepared and placed as drops on a glass slide. The samples were cured for various times under the same 405 nm exposure intensity (1000 mW/cm$^2$) with an LED. The exposure time for full cure (FC) was determined by measuring the time at which the drop no longer picked off fibers from a cotton tip. The color disappearance (CD) was determined by a visible inspection of the material after exposure.

|         | 25    | 26    |
|---------|-------|-------|
| UR5     | 30    |       |
| UR12    |       | 70    |
| DMA     | 25    | 25    |
| IBOA    | 39    |       |
| DP      | 3     |       |
| PPO     | 1     | 1     |
| TPM     | 2     |       |
| HPK     |       | 2     |
| FS      |       | 2     |
| Dye a   | 0.002 | 0.002 |
| FC (sec)| 10    | 3     |
| CD (sec)| 15    | 5     |

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A radiation curable composition comprising a substantially homogeneous admixture of an organic, free radical polymerizable component, a free radical photopolymerization initiator, and a pyridin-2,6-dione oxonol dye.

2. The composition of claim 1 wherein the free radical photopolymerization initiator is present in an amount sufficient to initiate the free radical polymerization of said free radical polymerizable component upon exposure to sufficient actinic radiation.

3. The composition of claim 1 wherein the free radical photopolymerization initiator initiates the free radical polymerization of said free radical polymerizable component upon exposure to sufficient actinic radiation in the visible and/or ultraviolet region of the electromagnetic spectrum.

4. The composition of claim 1 wherein the free radical polymerizable component is present in an amount of from about 30 wt. % to about 99 wt. % of the radiation curable composition.

5. The composition of claim 1 wherein the free radical photopolymerization initiator is present in an amount of from about 0.1 wt. % to about 10 wt. % of the radiation curable composition.

6. The composition of claim 1 wherein the pyridin-2,6-dione oxonol dye is present in an amount of from about 0.002% to about 0.2% based on the weight of the radiation curable composition.

7. The composition of claim 1 which is an adhesive or a coating composition.

8. The composition of claim 1 which is substantially free of organic, nonreactive solvents.

9. The composition of claim 1 wherein said organic, free radical polymerizable component comprises an acrylate or methacrylate.

10. The composition of claim 1 wherein the free radical polymerizable component comprises a urethane acrylate oligomer or a urethane methacrylate oligomer in combination with an acrylate monomer or a methacrylate monomer.

11. The composition of claim 1 wherein the free radical photopolymerization initiator comprises a ketone or a phosphine oxide.

12. The composition of claim 1 wherein the pyridin-2,6-dione oxonol dye which comprises both a carbonyl group and a carbinol group, or both a carbonyl group and an oxide salt.

13. The composition of claim 12 wherein the pyridin-2,6-dione oxonol dye has the formula $Z_1$=(CH—CH=)$_n$CH—$Z_2$ wherein $Z_1$ contains the carbonyl group, $Z_2$ contains the carbinol group or oxide salt, n is an integer 0, 1, 2, or 3, and $Z_1$ and $Z_2$ each represent an atomic group that forms a 5 or 6 membered ring.

14. The composition of claim 1 wherein the pyridin-2,6-dione oxonol dye comprises at least one of:
 (a) 5-cyano-3-[3-(5-cyano-1-ethyl-4-methyl-2,6-dioxopyridin-3-ylidene)prop-1-enyl]-1-ethyl-4-methyl-6-oxopyridin-2-olate; triethylazanium;
 (b) 5-cyano-3-[3-(5-cyano-1-methyl-4-methyl-2,6-dioxopyridin-3-ylidene)prop-1-enyl]-1-methyl-4-methyl-6-oxopyridin-2-olate; triethylazanium;
 (c) 5-cyano-3-[3-(5-cyano-1-propyl-4-methyl-2,6-dioxopyridin-3-ylidene)prop-1-enyl]-1-propyl-4-methyl-6-oxopyridin-2-olate; triethylazanium;
 (d) 5-cyano-3-[3-(5-cyano-1-n-butyl-4-methyl-2,6-dioxopyridin-3-ylidene)prop-1-enyl]-1-n-butyl-4-methyl-6-oxopyridin-2-olate; triethylazanium;
 (e) 5-cyano-3-[3-(5-cyano-1-t-butyl-4-methyl-2,6-dioxopyridin-3-ylidene)prop-1-enyl]-1-t-butyl-4-methyl-6-oxopyridin-2-olate; triethylazanium;
 (f) 5-cyano-3-[3-(5-cyano-1-phenyl-4-methyl-2,6-dioxopyridin-3-ylidene)prop-1-enyl]-1-phenyl-4-methyl-6-oxopyridin-2-olate; triethylazanium;

(g) 5-cyano-3-[3-(5-cyano-1-ethyl-4-methyl-2,6-dioxopyridin-3-ylidene)penta-1,3-dienyl]-1-ethyl-4-methyl-6-oxopyridin-2-olate; triethylazanium;
(h) 5-cyano-3-[3-(5-cyano-1-ethyl-4-methyl-2,6-dioxopyridin-3-ylidene)methenyl]-1-ethyl-4-methyl-6-oxopyridin-2-olate; triethylazanium;
(i) 5-cyano-3-[3-(5-cyano-1-ethyl-4-methyl-2,6-dioxopyridin-3-ylidene)prop-1-enyl]-1-ethyl-4-methyl-6-oxopyridin-2-olate; sodium;
(j) 5-cyano-3-[3-(5-cyano-1-methyl-4-methyl-2,6-dioxopyridin-3-ylidene)prop-1-enyl]-1-methyl-4-methyl-6-oxopyridin-2-olate; sodium;
(k) 5-cyano-3-[3-(5-cyano-1-ethyl-4-methyl-2,6-dioxopyridin-3-ylidene)prop-1-enyl]-1-ethyl-4-methyl-6-oxopyridin-2-olate; tetramethylammonium;
(l) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-diphenyl-4,4'-bipryridinium;
(m) 5-cyano-3-[3-(5-cyano-1-ethyl-4-methyl-2,6-dioxopyridin-3-ylidene)prop-1-enyl]-1-ethyl-4-methyl-6-oxopyridin-2-olate; [4-methylphenyl-(2-methylpropyl)phenyl]iodonium;
(n) 5-cyano-3-[3-(5-cyano-1-ethyl-4-methyl-2,6-dioxopyridin-3-ylidene)prop-1-enyl]-1-ethyl-4-methyl-6-oxopyridin-2-olate; tri-(2-hydroxyethyl)azanium;
(o) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-diheptyl-4,4'-bipyridinium;
(p) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 4-methylmorpholinium;
(q) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 2-bromo-1-ethyl-pyridinium
(r) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-diethyl-4,4'-bipyridinium;
(s) 5-cyano-3-[3-(5-cyano-1-ethyl-4-methyl-2,6-dioxopyridin-3-ylidene)prop-1-enyl]-1-ethyl-4-methyl-6-oxopyridin-2-olate; 1,1'-dibenzyl-4,4'bipyridinium; or
(t) 1-butyl-5-(3-(1-butyl-5-cyano-1,6-dihydro-2-hydroxy-4-methyl-6-oxo-3-pyridyl)allylidene)-1,2,5,6-tetrahydro-4-methyl-2,6-dioxonicotinonitrile (CAS 30132-47-9).

15. A method of preparing a radiation curable composition comprising forming a substantially homogeneous admixture of an organic, free radical polymerizable component, a free radical photopolymerization initiator, and an pyridin-2,6-dione oxonol dye; wherein the free radical photopolymerization initiator is present in an amount sufficient to initiate the polymerization of said free radical polymerizable component upon exposure to sufficient actinic radiation.

16. A method for adhering a first surface to a second surface which comprises:
a) applying to a first surface a radiation curable composition comprising a substantially homogeneous admixture of an organic, free radical polymerizable component, a free radical photopolymerization initiator, and an pyridin-2,6-dione oxonol dye, wherein the free radical photopolymerization initiator is present in an amount sufficient to initiate the polymerization of said free radical polymerizable component upon exposure to sufficient actinic radiation;
b) contacting a second surface to the radiation curable composition; and
c) exposing the radiation curable composition to sufficient actinic radiation to initiate the polymerization of said polymerizable component while maintaining contact of the radiation curable composition with the first surface and the second surface.

17. The method of claim 16 wherein the free radical polymerizable component comprises a urethane acrylate oligomer or a urethane methacrylate oligomer in combination with an acrylate monomer or a methacrylate monomer; wherein the free radical photopolymerization initiator comprises a ketone or a phosphine oxide.

18. A method for curing a radiation curable composition which comprises:
a) applying to a first surface a radiation curable composition comprising a substantially homogeneous admixture of an organic, free radical polymerizable component, a free radical photopolymerization initiator, and an pyridin-2,6-dione oxonol dye, wherein the free radical photopolymerization initiator is present in an amount sufficient to initiate the polymerization of said free radical polymerizable component upon exposure to sufficient actinic radiation; and
b) exposing the radiation curable composition to sufficient actinic radiation to initiate the free radical polymerization of said free radical polymerizable component.

19. The method of claim 18 wherein the free radical polymerizable component comprises a urethane acrylate oligomer or a urethane methacrylate oligomer in combination with an acrylate monomer or a methacrylate monomer; wherein the free radical photopolymerization initiator comprises a ketone or a phosphine oxide.

20. A method for adhering a coating to a surface which comprises
a) applying to a surface a radiation curable composition comprising a substantially homogeneous admixture of an organic, free radical polymerizable component, a free radical photopolymerization initiator, and an pyridin-2,6-dione oxonol dye, wherein the free radical photopolymerization initiator is present in an amount sufficient to initiate the polymerization of said free radical polymerizable component upon exposure to sufficient actinic radiation; and
b) exposing the radiation curable coating composition to sufficient actinic radiation to initiate the free radical polymerization of said free radical polymerizable component.

21. The method of claim 20 wherein the free radical polymerizable component comprises a urethane acrylate oligomer or a urethane methacrylate oligomer in combination with an acrylate monomer or a methacrylate monomer; wherein the free radical photopolymerization initiator comprises a ketone or a phosphine oxide.

22. The method of claim 15 wherein the free radical polymerization of said free radical polymerizable component is initiated by exposure of the photopolymerization initiator to sufficient actinic radiation in the visible and/or ultraviolet region of the electromagnetic spectrum.

23. The method of claim 15 wherein the free radical polymerization of said free radical polymerizable component is initiated by exposure of the photopolymerization initiator to radiation having a wavelength of from about 300 nm to about 465 um.

24. The method of claim 16 wherein the free radical polymerization of said free radical polymerizable component is initiated by exposure of the photopolymerization initiator to radiation having a wavelength of from about 300 nm to about 465 nm.

25. The method of claim 18 wherein the free radical polymerization of said free radical polymerizable component is initiated by exposure of the photopolymerization initiator to radiation having a wavelength of from about 300 nm to about 465 um.

26. The method of claim 20 wherein the free radical polymerization of said free radical polymerizable component is initiated by exposure of the photopolymerization initiator to radiation having a wavelength of from about 300 nm to about 465 nm.

* * * * *